US008825464B2

(12) United States Patent
Srinivasan

(10) Patent No.: US 8,825,464 B2
(45) Date of Patent: Sep. 2, 2014

(54) METHOD AND APPARATUS FOR PARALLELIZATION OF SEQUENTIAL POWER SIMULATION

(75) Inventor: Vijay S. Srinivasan, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 556 days.

(21) Appl. No.: 12/202,761

(22) Filed: Sep. 2, 2008

(65) Prior Publication Data

US 2010/0057429 A1 Mar. 4, 2010

(51) Int. Cl.
*G06F 17/50* (2006.01)

(52) U.S. Cl.
CPC ........ *G06F 17/5027* (2013.01); *G06F 17/5022* (2013.01); *G06F 17/5036* (2013.01); *G06F 17/5009* (2013.01)
USPC ................. 703/14; 703/13; 703/15; 703/16

(58) Field of Classification Search
CPC .................................................. G06F 17/5022
USPC ...................................................... 703/14–16
See application file for complete search history.

(56) References Cited

U.S. PATENT DOCUMENTS

| | | | | | |
|---|---|---|---|---|---|
| 5,375,074 | A | * | 12/1994 | Greenberg et al. | 703/17 |
| 5,473,548 | A | * | 12/1995 | Omori et al. | 716/109 |
| 5,521,834 | A | * | 5/1996 | Crafts et al. | 716/108 |
| 5,535,370 | A | * | 7/1996 | Raman et al. | 703/15 |
| 5,625,803 | A | * | 4/1997 | McNelly et al. | 703/14 |
| 5,668,732 | A | * | 9/1997 | Khouja et al. | 702/60 |
| 5,673,420 | A | * | 9/1997 | Reyes et al. | 703/13 |
| 5,682,320 | A | * | 10/1997 | Khouja et al. | 716/103 |
| 5,692,160 | A | * | 11/1997 | Sarin | 703/23 |
| 5,696,694 | A | * | 12/1997 | Khouja et al. | 716/120 |
| 5,740,407 | A | * | 4/1998 | Yeap et al. | 703/13 |
| 5,768,145 | A | * | 6/1998 | Roethig | 703/14 |
| 5,838,947 | A | * | 11/1998 | Sarin | 703/14 |
| 5,847,966 | A | * | 12/1998 | Uchino et al. | 716/109 |
| 5,940,779 | A | * | 8/1999 | Gaitonde et al. | 702/60 |
| 6,021,381 | A | * | 2/2000 | Ohnishi | 702/60 |
| 6,075,932 | A | * | 6/2000 | Khouja et al. | 702/60 |
| 6,163,876 | A | | 12/2000 | Ashar et al. | |
| 6,249,898 | B1 | * | 6/2001 | Koh et al. | 716/109 |
| 6,321,185 | B1 | * | 11/2001 | Takahashi | 703/18 |

(Continued)

OTHER PUBLICATIONS

A Gate Level Simulator for Power Consumption Analysis by David J. Pursley, 1996, pp. 1-28.*

(Continued)

*Primary Examiner* — Akash Saxena
(74) *Attorney, Agent, or Firm* — Polsinelli PC

(57) ABSTRACT

One particular implementation takes the form of an apparatus or method for parallelizing a sequential power simulation of an integrated circuit device. The implementation may temporally divide the simulation so that separate time segments of the simulation can be run at the same time, thereby reducing he required time necessary to perform the power simulation. More particularly, a logic simulation may be performed on the integrated circuit and snapshots of the logic devices of the integrated circuit may be taken at a specified period. The separate time segments of the simulation may then be simulated in a parallel manner to simulate power consumption of the integrated circuit. Performing the power simulation on the separate time segments may reduce the required time of a typical power consumption simulation of an integrated circuit.

15 Claims, 3 Drawing Sheets

(56) References Cited

U.S. PATENT DOCUMENTS

| | | | |
|---|---|---|---|
| 6,338,025 B1* | 1/2002 | Bowen et al. | 702/60 |
| 6,363,515 B1* | 3/2002 | Rajgopal et al. | 716/105 |
| 6,378,119 B1* | 4/2002 | Raves | 716/54 |
| 6,493,659 B1* | 12/2002 | Takita | 703/14 |
| 6,625,781 B2* | 9/2003 | Roethig et al. | 716/109 |
| 6,865,722 B2* | 3/2005 | Chen et al. | 716/109 |
| 6,910,025 B2* | 6/2005 | Cao | 706/15 |
| 7,051,300 B1* | 5/2006 | Shen et al. | 716/104 |
| 7,076,405 B1* | 7/2006 | Uchino | 703/2 |
| 7,134,100 B2 | 11/2006 | Ravi et al. | |
| 7,143,376 B1 | 11/2006 | Eccles | |
| 7,313,510 B2* | 12/2007 | Karunaratne | 703/14 |
| 7,421,382 B2* | 9/2008 | Blatt et al. | 703/13 |
| 7,460,965 B2* | 12/2008 | Saeki et al. | 702/57 |
| 7,720,667 B2* | 5/2010 | Chaudhry et al. | 703/18 |
| 8,010,824 B2* | 8/2011 | Naffziger | 713/340 |
| 8,095,354 B2* | 1/2012 | Tamaki et al. | 703/18 |
| 2002/0095279 A1* | 7/2002 | Battu' et al. | 703/15 |
| 2002/0138809 A1* | 9/2002 | Roethig et al. | 716/1 |
| 2003/0097348 A1* | 5/2003 | Cao | 706/12 |
| 2003/0110019 A1* | 6/2003 | Blatt et al. | 703/18 |
| 2004/0019859 A1* | 1/2004 | Ravi et al. | 716/4 |
| 2004/0243376 A1* | 12/2004 | Karunaratne | 703/18 |
| 2005/0010598 A1* | 1/2005 | Shankar | 707/104.1 |
| 2006/0277509 A1* | 12/2006 | Tung et al. | 716/5 |
| 2007/0220292 A1* | 9/2007 | Ishihara et al. | 713/320 |
| 2007/0225959 A1* | 9/2007 | Grochowski et al. | 703/15 |
| 2008/0077380 A1* | 3/2008 | Tamaki et al. | 703/15 |
| 2008/0140379 A1* | 6/2008 | Shah et al. | 703/14 |
| 2008/0288910 A1* | 11/2008 | Chaudhry et al. | 716/17 |
| 2008/0300806 A1* | 12/2008 | Nakanishi | 702/61 |
| 2009/0031268 A1* | 1/2009 | Miranda et al. | 716/6 |
| 2009/0150136 A1 | 6/2009 | Yang | |
| 2009/0157375 A1* | 6/2009 | Yamamoto et al. | 703/14 |
| 2009/0171646 A1* | 7/2009 | Silbermintz et al. | 703/16 |
| 2009/0271167 A1* | 10/2009 | Zhu et al. | 703/14 |
| 2010/0057429 A1* | 3/2010 | Srinivasan | 703/19 |
| 2010/0070257 A1* | 3/2010 | Mylavarapu et al. | 703/16 |
| 2010/0107130 A1 | 4/2010 | Bowers et al. | |
| 2010/0217577 A1* | 8/2010 | Korobkov et al. | 703/18 |
| 2011/0035203 A1* | 2/2011 | Dalton et al. | 703/14 |
| 2011/0072412 A1* | 3/2011 | Hasslen et al. | 717/106 |
| 2012/0046931 A1* | 2/2012 | Takahashi et al. | 703/15 |
| 2012/0192129 A1 | 7/2012 | Bowers et al. | |
| 2012/0245907 A1* | 9/2012 | Yagyuu | 703/2 |
| 2013/0167098 A1* | 6/2013 | Fennell et al. | 716/112 |

OTHER PUBLICATIONS

ACM paper "Parallel Algorithms for Power Estimation" by Victor Kim et al; ACM 1998 pp. 672-677.*

"PowerPlay—Fast Dynamic Power Estimation Based on the Logic Simulation" by Thomas Krodel, pp. 96-100, IEEE 1991.*

"IRSIM: An incremental MOS Switch Level Simulator" by Arturo Salz et al ACM 1989 pp. 173-178.*

Final Office Action regarding U.S. Appl. No. 12/978,193, May 15, 2013.

Response to Final Office Action regarding U.S. Appl. No. 12/978,193, Jul. 17, 2013.

Non-Final Office Action regarding U.S. Appl. No. 12/978,193, dated Oct. 9, 2013.

Non-Final Office Action regarding U.S. Appl. No. 12/978,193, Jan. 14, 2013.

Response to Non-Final Office Action regarding U.S. Appl. No. 12/978,193, Apr. 15, 2013.

Response to Non-Final Office Action regarding U.S. Appl. No. 12/978,193, Feb. 10, 2014.

Samir Palnitkar Verilog HDL A Guide to Digital Design and Synthesis, Sunsoft Press A Prentice Hall Title, pp. 306-312, Sun Microsystem 1996.

* cited by examiner

METHOD AND APPARATUS FOR PARALLELIZATION OF SEQUENTIAL POWER SIMULATION

FIELD OF THE INVENTION

Aspects of the present invention relate to power simulation of an integrated circuit device. More particularly, aspects of the present invention involve a method and system for parallelizing the power simulation of an integrated circuit device to increase the speed and efficiency of the simulation.

BACKGROUND

Prior to fabrication or manufacturing, integrated circuit devices generally undergo a series of computer simulations to ensure proper functionality of the device. These simulations generally include logic simulations to ensure the device functions as expected and power simulations to ensure the device consumes the expected amount of power during use. To perform these simulations, a simulator may apply a series of input vectors or patterns to a gate-level logic netlist that represents the integrated circuit design. The simulator will then monitor the transitions of the gates of the integrated circuit as the patterns propagate through the circuit.

Logic simulations using commercial simulators are typically event driven, meaning that the simulator does not need to compute the state for each gate at every clock cycle. Instead, the simulator may only note the output of a gate when the input to the gate has changed. This makes commercial simulators very fast at performing logic simulations with long input vectors since, typically at any one time, only a small subset of gates in a netlist see value changes on their inputs during simulation.

Conversely, power simulations of complex integrated circuits are not event driven. Many power simulators use a logic simulation as described above to monitor gates as they change states to predict the power consumption for each state change. However, power simulators must also monitor each gate that is not changing to account for current that may leak from the gate at every clock cycle. The combination of power consumed during the state changing of the gates and the amount of current leak of the non-changing gates give an overall picture of power consumption.

SUMMARY

As described above, power simulation of an integrated circuit typically requires a series of input vectors applied to a netlist describing the design of the integrated circuit. The power consumption of each gate is monitored as the input vectors propagate through the integrated circuit design to provide the total power consumption of the integrated circuit when in use. To identify a worst-case power consumption scenario, gate-level power simulations are typically performed for a million clock cycles or more. However, because the simulator must monitor every gate of the netlist at every clock cycle to accurately simulate power consumption, power simulations running a million clock cycles can take several months to perform.

Thus, what is needed is a method to perform power simulations on complex integrated circuits that is both accurate and does not require an inordinate amount of time to complete the simulation.

One embodiment may take the form of a method for conducting a power consumption simulation of an integrated circuit. The method may comprise dividing a serial power consumption simulation of an integrated circuit into a plurality of time segments based on a specified number of clock cycles. Further, the method may simulate power consumption of the integrated circuit for at least some of the plurality of time segments simultaneously. Finally, the method may aggregate the results of the simulations of the integrated circuit for the plurality of time segments.

Another embodiment may take the form a second method for conducting a power consumption simulation of an integrated circuit. This method may comprise dividing a serial power consumption simulation of the integrated circuit into a plurality of time segments based on a specified number of clock cycles. The method may then generate a plurality of time slices, each time slice corresponding to the plurality of time segments. Further, the method may simulate power consumption of the integrated circuit for at least some of the plurality of time segments simultaneously using the corresponding plurality of time slices. Finally, the method may aggregate the results of simulations of the integrated circuit for the plurality of time segments.

Another embodiment may take the form of a system for conducting a power consumption simulation of an integrated circuit. The system may comprise a first module configured to divide a serial power consumption simulation of an integrated circuit into a plurality of time segments based on a specified number of clock cycles. The system may further include a simulator configured to simulate power consumption of the integrated circuit for at least some of the plurality of time segments simultaneously. Finally, the system may include a second module configured to aggregate the results of the simulations of the integrated circuit for the plurality of time segments.

DETAILED DESCRIPTION

One particular implementation may take the form of an apparatus or method for parallelizing a sequential power simulation of an integrated circuit device. The implementation may temporally divide the serial simulation into separate time segments that can be simulated in a parallel manner, thereby reducing the required time necessary to perform the power simulation.

More particularly, the method for parallelization of a sequential power simulation may be performed as follows. Before simulation of each time segment, a time slice for that segment may be generated. A time slice may include information needed by a simulator to perform a power simulation on each time segment of the serial simulation. In one implementation, the time slice may include the logic netlist of the integrated circuit device, the input vectors to be applied to the circuit during the particular time segment, a snapshot of the states of the logic components of the integrated circuit at the beginning of the time segment and commands to initialize the states of the logic components according to the snapshot.

Using the time slice for each time segment, a serial power simulation may be parallelized to increase the speed of the simulation. Separate simulation benches may be used to simulate the power consumption of the integrated circuit by performing power simulations on multiple time segments at the same time. Each simulation bench may use the information of the time slices described above to perform power simulation on each time segment. In this manner, the sequential power simulation of the integrated circuit may be run on multiple simulation benches at the same time, thereby parallelizing the simulation and possibly reducing the time necessary to perform the simulation.

Figure 1:
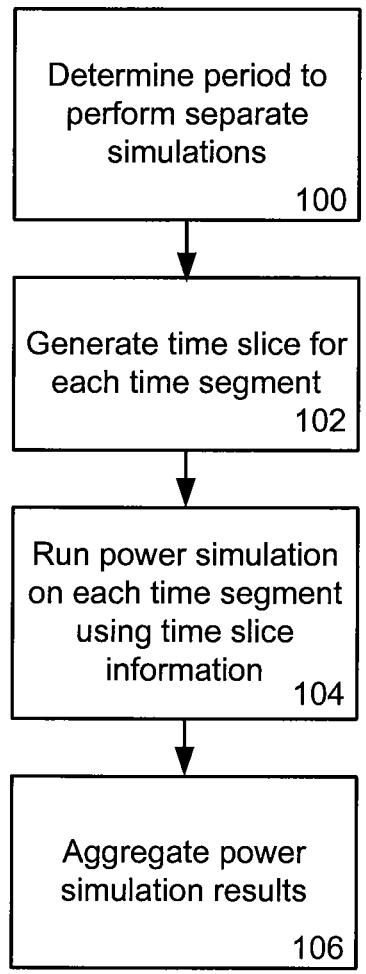
FIG. 1 illustrates one embodiment of a method for parallelizing a sequential power simulation.

FIG. 1 illustrates one embodiment of a method for parallelizing a sequential power simulation. Through this embodiment, a sequential power simulation may be performed in a parallelized manner that may reduce the time necessary to conduct the power simulation.

The embodiment may begin in operation 100 by determining the period to separate the serial simulation into time segments for the parallel simulations. In this operation, a period of time for defining the time segments may be determined for performing the separate power simulations in a parallelized manner. For example, it may be determined that the serial simulation may be broken up into 50 separate time segments for parallel simulation. Thus, for a serial simulation that may run for 1 million clock cycles, operation 100 may establish a 20,000 clock cycle period to break up the simulation into 50 separate time segments, resulting in 1 million total clock cycles. The period determined in operation 100 may vary depending on many factors. One such factor may be the number of simulation benches available to perform the parallel simulations. Another factor may be the desired speed of the power simulation. In general, the shorter the period determined in operation 100, the faster the parallelized power simulation may occur. However, as mentioned, the period may vary to any number of clock cycles as appropriate or desired.

After the period or separating the overall simulation into time segments is determined, the time slices for each time segment may be generated in operation 102. As stated above, time slices may include information needed by a simulation bench to perform a power simulation on each time segment of the serial simulation. Each time slice may include the netlist of the integrated circuit device, the input vectors to be applied to the circuit during the particular time segment, a snapshot of the states of the logic components at the beginning of the particular time segment and commands to initialize the states of the logic components according to the snapshot. The generation of the time slices is discussed in more detail below in FIG. 2.

The number of time slices generated in operation 102 may depend on the period determined in operation 100. Continuing the above example, a time slice may be generated for the first time segment, namely 0 clock cycles to 20,000 clock cycles. A second time slice may also be generated for the next time segment, namely 20,000 clock cycles to 40,000 clock cycles. The time slices may continue to be generated at each period until a time slice is generated for every time segment of the serial simulation. Thus, in this example, 50 time slices providing information for 50 time segments may be generated, each time segment representing 20,000 clock cycles.

In operation 104, a power simulation may be performed on the time segments using multiple simulation benches. The power simulation of the separate time segments is described in more detail below in FIG. 3. By performing the power simulation simultaneously on multiple simulation benches, the time required to conduct the simulation may be reduced when compared the time required to perform a typical power consumption simulation. The reduction in the required time is a product of the time segments being tested at the same time rather than sequentially. For example, the second time segment does not have to wait until the first time segment has been simulated before it too can be simulated. Instead, the first time segment and second time segment can be tested in a parallel manner, thereby reducing the required time necessary for conducting the power consumption simulation.

In operation 106, the power simulation results from the multiple simulations of the time segments may be aggregated to obtain the complete power consumption for the entire integrated circuit. This information may be used by the integrated circuit designers to ensure that the power consumption of the integrated circuit is within the designed bounds. Further, the power simulation described above may reduce the necessary time typically required for such simulations.

Figure 2:
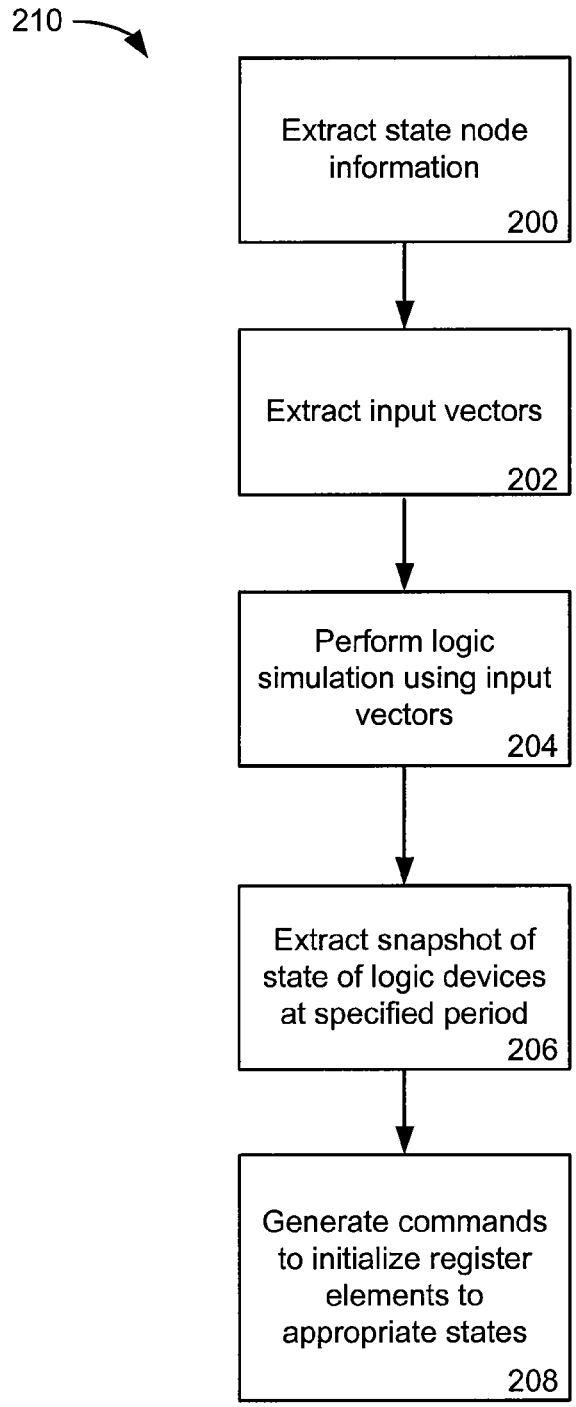
FIG. 2 illustrates another embodiment that may generate the time slices for each time segment of the power simulation of an integrated circuit.

FIG. 2 depicts another embodiment that may generate the time slices for each time segment of the power simulation of an integrated circuit. The operations presented in this embodiment 210 may describe in more detail operation 102 of FIG. 1.

The time slices for each time segment may include state node information of the logic netlist. This information may be extracted in operation 200. As described above, during design of an integrated circuit, a netlist that describes the logic of the integrated circuit may be created. This netlist may be used by a simulation bench to simulate the integrated circuit before manufacturing. The netlist may include all register elements, including but not limited to flop devices, register files and caches. Thus, in operation 200, the logic netlist, or description of the logic of the integrated circuit, may be extracted and stored as a file that may be included in a simulator bench. This file may be stored in the time slice for a given time segment of the serial power simulation and may be used by a simulator when simulating the power consumption of an integrated circuit in a parallelized manner.

In operation 202, the input vectors to be applied the netlist during a time segment may be extracted. As stated above, to perform simulation on a netlist, a series of input vectors may be applied to the netlist to monitor the propagation of the vectors through the integrated circuit. Thus, to simulate the separate time segments of the power simulation, input vectors for each time segment may be extracted and stored as part of the time slice for that segment in operation 202. For example, a period may be specified at 20,000 clock cycles, as in operation 100 of FIG. 1. Thus, the time segments of each parallelized simulation may be 20,000 clock cycles long. During the 20,000 clock cycles, a series of input vectors may be applied to the netlist to simulate the integrated circuit. Thus, in operation 202, the input vectors to be applied to the netlist for the time segment between 0 clock cycles and 20,000 clock cycles may be extracted. These input vectors may be part of the generated time slice for that time segment and may be used by a simulation bench to simulate the time segment.

In operation 204, a logic simulation may be performed on the netlist using input vectors. During simulation of an integrated circuit, input vectors may be applied to the netlist. As the input vectors are applied to the netlist, the simulator may monitor the netlist to ensure that the design of the integrated circuit is operating as designed. As explained above, the logic simulation may occur as an event driven simulation, meaning that the simulator may only note a change in the state of a logic device rather than monitoring all logic devices of the integrated circuit. In this manner, the logic simulation of an integrated circuit may be performed rapidly compared to the time necessary to complete a typical power simulation.

After the logic simulation has been performed for a specified period, a snapshot of the state of the logic devices described by the netlist may be extracted in operation 204.

The snapshot may include the state of each logic device in the netlist at the specified period. For example, assume a period of 20,000 clock cycles is specified, as in operation 100 of FIG. 1. Thus, in operation 202, logic simulation of the netlist may be performed for 20,000 clock cycles. After the 20,000 clock cycles of simulation, the states of the logic devices of the netlist will likely have changed as the input vectors are applied to the netlist. Thus, a snapshot of the states of the logic devices of the netlist after 20,000 clock cycles of simulation may be extracted into a file. This file may be included in the time slice generated for the time segment of 20,000 clock cycles to 40,000 clock cycles. This file may then be used by a simulator to perform simulation on the netlist for that time segment as described below. Snapshots for each time segment may be extracted in a similar manner. Thus, the time slice generated for the time segment of 40,000 clock cycles to 60,000 clock cycles may also include a snapshot of the states of the logic devices of the netlist after logic simulation of 40,000 clock cycles. The number of snapshots extracted during a simulation may vary based on the specified period.

The snapshots extracted in operation 204 may be used to initialize the logic devices of the netlist for each time segment. Continuing the above example, to accurately conduct a power consumption simulation on the time segment of 20,000 clock cycles to 40,000 clock cycles, the states of the logic devices of the netlist may be initialized to the states of the devices after 20,000 clock cycles of simulation. After initialization of the logic devices, an accurate power consumption simulation may then be performed on the netlist. Without initialization, the power consumption simulation of the time segment between 20,000 clock cycles and 40,000 clock cycles may not be accurate as the state changes of the logic devices may not be accurate. Because the snapshot may be used to initialize the logic devices of each time segment to the proper states at the beginning of the time segment, the snapshot for the first time segment may be extracted before any logic simulation of the netlist has occurred.

Finally, commands to initialize the register devices of the netlist to the correct starting point may be generated in operation 208. As described above, the logic devices of the netlist may be initialized to the proper values to begin the power consumption simulation. The commands to initialize the logic devices of the netlist into the proper states may be generated in operation 208 and loaded into a file for use when generating the time slice.

Using the information extracted in the embodiment 210, time slices may be generated for each time segment. The time slices generated may allow separate simulators to simultaneously simulate the power consumption of an integrated circuit. For example, a serial power consumption simulation may be divided into separate time segments. These time segments may have a time slice associated with each segment that contains information that may be used by a simulator bench to simulate each segment. The generated time slices may include a netlist describing the integrated circuit, input vectors to be applied to the netlist during a particular time segment of the simulation, a snapshot of the states of the logic devices of the netlist at a specified period and commands to initialize the netlist to the proper states to mirror the snapshot. In this manner, the separate time segments may be simulated simultaneously on parallel simulation benches, thereby reducing the time required to conduct a power consumption simulation.

Figure 3:
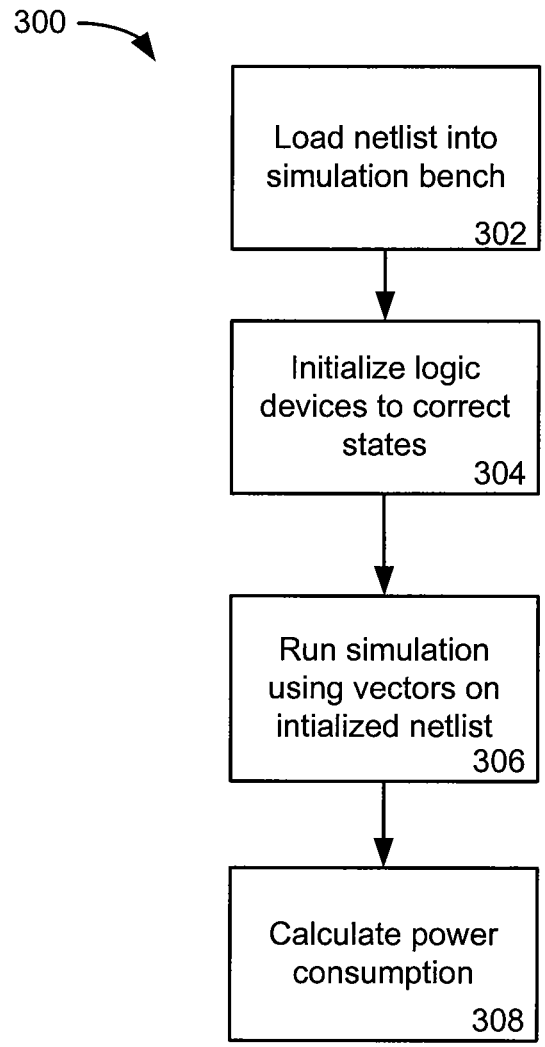
FIG. 3 illustrates another embodiment that may run parallel power simulations on each time segment simultaneously.

FIG. 3 depicts another embodiment that may run parallel power simulations on the generated time slices. The operations presented in this embodiment 300 may describe in more detail operation 104 of FIG. 1.

After the time slices are generated for each time segment, the time segments may each undergo a power consumption simulation in the embodiment 300 of FIG. 3. Simulation of each time segment may take place on separate simulation benches, allowing the separate segments of the serial simulation to be performed simultaneously in a parallelized manner.

To begin power simulation of the time slices, the netlist may first be loaded into each simulation bench in operation 302. The netlist information may be contained in the time slice of the particular time segment to be simulated on that simulation bench. After the netlist is loaded into the simulation bench, the logic devices of the netlist on the simulation bench may be initialized to the correct states in operation 304. As described above, a snapshot of the states of the logic devices of the netlist may be extracted in operation 206. Further, commands to initialize the logic devices into the correct states may be extracted in operation 208 described above. Using the snapshots and commands contained in the time slice of the particular time segment to be simulated on each simulation bench, the logic devices may be initialized to the correct state for power consumption simulation.

Next, the input vectors extracted in operation 202 described above for each time segment may be applied to the initialized time segments in operation 306. As described above, input vectors are generally applied to a netlist to conduct the simulation of an integrated circuit. In operation 306, the input vectors of the time slice corresponding to the particular time segment to be simulated on that simulation bench may be applied to the initialized time segment to conduct the power simulation. Thus, for a time segment of 20,000 clock cycles to 40,000 clock cycles, the associated input vectors to be applied to the netlist during those clock cycles would be applied to the time segment on the appropriate simulation bench.

As the input vectors are applied to the separate time segments, the power consumption of the integrated circuit may be calculated in operation 308. In this manner, the power consumption of the integrated circuit is calculated for the separate time segments of the simulation simultaneously rather than the serially. By performing the above operations on all of the time slices simultaneously, the power consumption of the entire integrated circuit may be calculated in a fraction of the time necessary to perform a typical power consumption simulation.

It should be noted that the flowcharts of FIG. 1, FIG. 2 and FIG. 3 are illustrative only. Alternative embodiments of the present invention may add operations, omit operations, or change the order of operations without affecting the spirit or scope of the embodiments.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for conducting a power consumption simulation of an integrated circuit, the method comprising:
dividing a serial power consumption simulation of the integrated circuit into a plurality of time segments based on a specified number of clock cycles by:
performing a forward-progressing logic simulation of the integrated circuit;
extracting first state information of a plurality of logic devices of the integrated circuit after the logic simulation is performed for a first time segment equal to the specified number of clock cycles;
extracting second state information of the plurality of logic devices of the integrated circuit after the logic simulation is performed for a second time segment equal to the specified number of clock cycles;
initializing a first representation of the plurality of logic devices of the integrated circuit according to the first extracted state information;
initializing a second representation of the plurality of logic devices of the integrated circuit according to the second extracted state information;
simulating power consumption of the first representation of the plurality of logic devices and the second representation of the logic devices simultaneously on a plurality of separate simulation benches; and
aggregating results of simulations of the integrated circuit for the plurality of time segments.

2. The method of claim 1 further comprising:
generating a respective time slice for each of the plurality of time segments.

3. The method of claim 2 wherein the generating a respective time slice operation further comprises:
generating a netlist, the netlist describing the plurality of logic devices of the integrated circuit.

4. The method of claim 3 wherein the generating a respective time slice operation further comprises:
generating a respective set of commands corresponding to each extracted state information, the respective set of commands configured to initialize the plurality of logic devices of a netlist according to the extracted state information; and
associating the generated set of commands with the respective time slice.

5. The method of claim 1 wherein the simulating power consumption operation further comprises, for each time segment:
loading a netlist into one of the plurality of separate simulation benches;
initializing a plurality of logic devices of the netlist;
applying a plurality of input vectors to the netlist; and
measuring the power consumption of the integrated circuit.

6. A method for conducting a power consumption simulation of an integrated circuit, the method comprising:
dividing a serial power consumption simulation of the integrated circuit into a plurality of time segments based on a specified number of clock cycles by:
generating a plurality of time slices, the plurality of time slices corresponding to the plurality of time segments;
performing a forward-progressing logic simulation of the integrated circuit;
extracting a first set of state information of a plurality of logic devices of the integrated circuit after the logic simulation is performed for the specified number of clock cycles;
continuing the logic simulation on the integrated circuit after the extraction of the first set of state information; and
extracting a second set of state information of the plurality of logic devices of the integrated circuit after the specified number of clock cycles of logic simulation has been performed on the continued logic simulation;
initializing a first representation of the plurality of logic devices of the integrated circuit according to the first set of extracted state information;
initializing a second representation of the plurality of logic devices of the integrated circuit according to the second set of extracted state information;
simulating power consumption of the first representation of the plurality of logic devices and the second representation of the logic devices simultaneously using the corresponding plurality of time slices on a plurality of separate simulation benches; and
aggregating results of simulations of the integrated circuit for the plurality of time segments.

7. The method of claim 6 wherein the generating a plurality of time slices operation further comprises:
extracting a netlist, the netlist describing the plurality of logic devices of the integrated circuit.

8. The method of claim 7 wherein the generating a plurality of time slices operation further comprises:
generating a first set of commands, the first set of commands configured to initialize the logic devices of the netlist according to the first set of state information.

9. The method of claim 8 wherein the generating a plurality of time slices operation further comprises:
generating a second set of commands, the second set of commands configured to initialize the logic devices of the netlist according to the second set of state information.

10. The method of claim 6 wherein the simulating power consumption operation further comprises, for each time segment:
loading a netlist into one of the plurality of separate simulation benches;
initializing a plurality of logic devices of the netlist;
applying a plurality of input vectors to the netlist; and
measuring the power consumption of the integrated circuit.

11. A system for conducting a power consumption simulation of an integrated circuit, the system comprising:
a computer configured to execute instructions that comprise:
a first module configured to divide a serial power consumption simulation of the integrated circuit into a plurality of segments based on a specified number of clock cycles;
a logic simulator module configured to perform a forward-progressing logic simulation of the integrated circuit and extract first state information of a plurality of logic devices of the integrated circuit after the logic simulation is performed for the specified number of clock cycles and extract second state information of the plurality of logic devices of the integrated circuit after the logic simulation is performed for an additional second time segment equal to the specified number of clock cycles;
a simulator configured to initialize a first representation of the plurality of logic devices of the integrated circuit according to the first set of extracted state information and a second representation of the plurality of logic devices of the integrated circuit according to the second extracted state information and to simulate power consumption of the first representation of the plurality of logic devices and the second representation of the logic devices simultaneously on a plurality of separate simulation benches; and a second module configured to aggregate results of simulations of the integrated circuit for the plurality of time segments.

12. The system of claim 11 further comprising:

a third module configured to generate a respective time slice for each of the plurality of segments.

13. The system of claim 12 wherein the third module is further configured to extract a netlist, the netlist describing the plurality of logic devices of the integrated circuit.

14. The system of claim 13 wherein the third module is further configured to:

generate a respective set of commands corresponding to each extracted state information, the respective set of commands configured to initialize the plurality of logic devices of the netlist according to the extracted state information; and associate the generated set of commands with the respective time slice.

15. The system of claim 11 wherein the simulator is further configured, for each time segment, to:

load a netlist into one of the plurality of separate simulation benches;

initialize a plurality of logic devices of the netlist;

apply a plurality of input vectors to the netlist; and measure the power consumption of the integrated circuit.

* * * * *

UNITED STATES PATENT AND TRADEMARK OFFICE
CERTIFICATE OF CORRECTION

PATENT NO. : 8,825,464 B2  
APPLICATION NO. : 12/202761  
DATED : September 2, 2014  
INVENTOR(S) : Srinivasan Page 1 of 1

It is certified that error appears in the above-identified patent and that said Letters Patent is hereby corrected as shown below:

On title page, column 2, under item (57), Abstract, line 6, delete "he" and insert -- the --, therefor.

Signed and Sealed this
Tenth Day of March, 2015

Michelle K. Lee
*Deputy Director of the United States Patent and Trademark Office*